United States Patent
Aftanas et al.

(10) Patent No.: US 11,912,240 B2
(45) Date of Patent: Feb. 27, 2024

(54) VEHICLE ARTICLE CARRIER RACK SYSTEM WITH STOWABLE, CONCEALABLE CROSS BARS

(71) Applicant: JAC Products, Inc., Saline, MI (US)

(72) Inventors: Jeffrey M. Aftanas, Ortonville, MI (US); Gordon Michie, LaSalle (CA); Michael J. Presley, Plymouth, MI (US)

(73) Assignee: JAC Products, Inc., Saline, MI (US)

( * ) Notice: Subject to any disclaimer, the term of this patent is extended or adjusted under 35 U.S.C. 154(b) by 0 days.

(21) Appl. No.: 17/453,581

(22) Filed: Nov. 4, 2021

(65) Prior Publication Data

US 2023/0135957 A1    May 4, 2023

(51) Int. Cl.
*B60R 9/045* (2006.01)
*B60R 9/08* (2006.01)

(52) U.S. Cl.
CPC ............... *B60R 9/045* (2013.01); *B60R 9/08* (2013.01)

(58) Field of Classification Search
CPC .................................. B65D 9/045; B65D 9/08
USPC ........................................................ 224/314
See application file for complete search history.

(56) References Cited

U.S. PATENT DOCUMENTS

| | | | | |
|---|---|---|---|---|
| 5,069,377 A | * | 12/1991 | Baughman | B60R 9/00 410/101 |
| 5,393,114 A | | 2/1995 | Christensen | |
| 5,494,327 A | | 2/1996 | Derecktor | |
| 5,497,924 A | * | 3/1996 | Fisch | B60R 9/04 224/326 |
| 5,497,925 A | * | 3/1996 | Lumpe | B60R 9/04 224/326 |
| 5,715,981 A | * | 2/1998 | Blomberg | B60R 9/04 224/325 |
| 6,286,739 B1 | | 9/2001 | Stapleton | |

(Continued)

FOREIGN PATENT DOCUMENTS

| | | |
|---|---|---|
| EP | 1470960 A1 | 10/2004 |
| FR | 2939386 A1 | 6/2010 |
| WO | WO-2021055328 A1 | 3/2021 |

OTHER PUBLICATIONS

Extended European search report, European Patent Application No. 22186985.2 dated Jan. 20, 2023, 12 pages.

*Primary Examiner* — Peter N Helvey
(74) *Attorney, Agent, or Firm* — HARNESS, DICKEY & PIERCE, P.L.C.

(57) ABSTRACT

A vehicle article carrier system is disclosed for supporting articles above an outer body surface of a vehicle. In one embodiment the system forms a swing-in-place style system with front and rear cross bar assemblies that can each be swung pivotally at one end from stowed positions on respective support rail assemblies, to operative positions extending perpendicularly between the support rail assemblies. In other embodiments the rear cross bar assembly is fully removable and can be positioned at a plurality of different longitudinal positions along the support rail assemblies. In all of the embodiments, the support rails include an L-shaped construction which is dimensioned in relation to the height of the cross bar assemblies, so the support rail assemblies are able to fully hide the cross bar assemblies from view when the cross bar assemblies are in their stowed positions. This provides an extremely clean looking aesthetic appearance, as well as significantly improving the aerodynamic efficiency of the system.

18 Claims, 7 Drawing Sheets

(56) References Cited

U.S. PATENT DOCUMENTS

| | | | |
|---|---|---|---|
| 6,338,428 B1 * | 1/2002 | Kawasaki | B60R 9/04 224/326 |
| 6,431,634 B1 | 8/2002 | Ananian | |
| 6,913,175 B2 | 7/2005 | Martin | |
| 7,090,103 B2 * | 8/2006 | Aftanas | B62H 3/02 224/325 |
| 7,296,836 B1 | 11/2007 | Sabo | |
| 7,296,837 B2 | 11/2007 | Niedziela et al. | |
| 7,464,977 B1 | 12/2008 | Price | |
| 7,753,425 B2 | 7/2010 | Niedziela et al. | |
| 8,485,403 B2 * | 7/2013 | Stahl | B60R 9/045 224/325 |
| 8,640,934 B2 * | 2/2014 | Jamieson | B60R 9/058 224/325 |
| 9,132,784 B2 | 9/2015 | Harrison | |
| 9,150,161 B2 | 10/2015 | Laverack et al. | |
| 9,725,046 B2 | 8/2017 | Perry | |
| 9,834,258 B2 | 12/2017 | Marr, Jr. | |
| 9,981,612 B2 | 5/2018 | Marr, Jr. | |
| 10,071,692 B2 | 9/2018 | Kmita et al. | |
| 10,543,790 B2 | 1/2020 | Marr, Jr. | |
| 10,940,803 B2 | 3/2021 | Ni et al. | |
| 11,007,948 B2 * | 5/2021 | Sala | B60R 9/045 |
| 11,052,828 B2 | 7/2021 | Huisman | |
| 11,072,376 B2 | 7/2021 | Condon et al. | |
| 2004/0134953 A1 | 7/2004 | Perez | |
| 2005/0023314 A1 | 2/2005 | Williams et al. | |
| 2008/0099519 A1 * | 5/2008 | Binder | B60R 9/04 29/592 |
| 2008/0100075 A1 | 5/2008 | Derecktor | |
| 2009/0321485 A1 * | 12/2009 | Jamieson | B60R 9/04 224/309 |
| 2010/0072237 A1 | 3/2010 | Green | |
| 2010/0194137 A1 | 8/2010 | Kealy | |
| 2011/0250042 A1 | 10/2011 | Juarez-Ortega | |
| 2015/0129625 A1 * | 5/2015 | Gorey | B60R 9/04 224/309 |
| 2015/0203050 A1 | 7/2015 | Finestone | |
| 2015/0258940 A1 | 9/2015 | Breeden, III et al. | |
| 2017/0066384 A1 | 3/2017 | Finestone | |
| 2020/0055457 A1 * | 2/2020 | Mansour | B60R 9/045 |

* cited by examiner

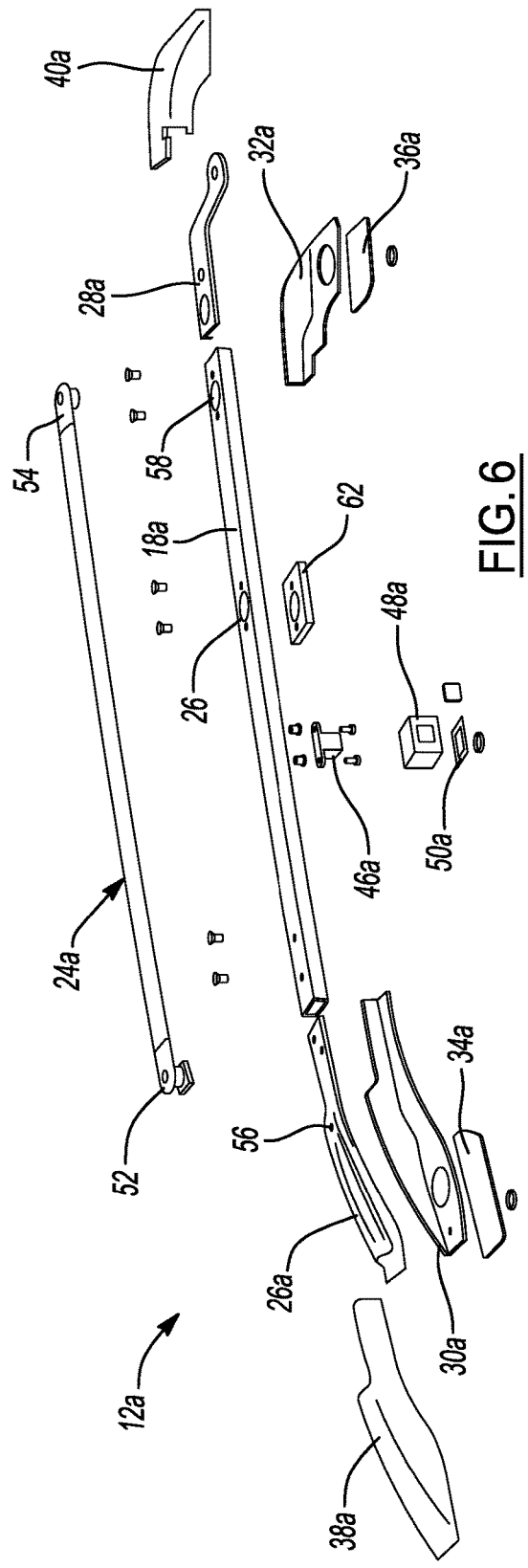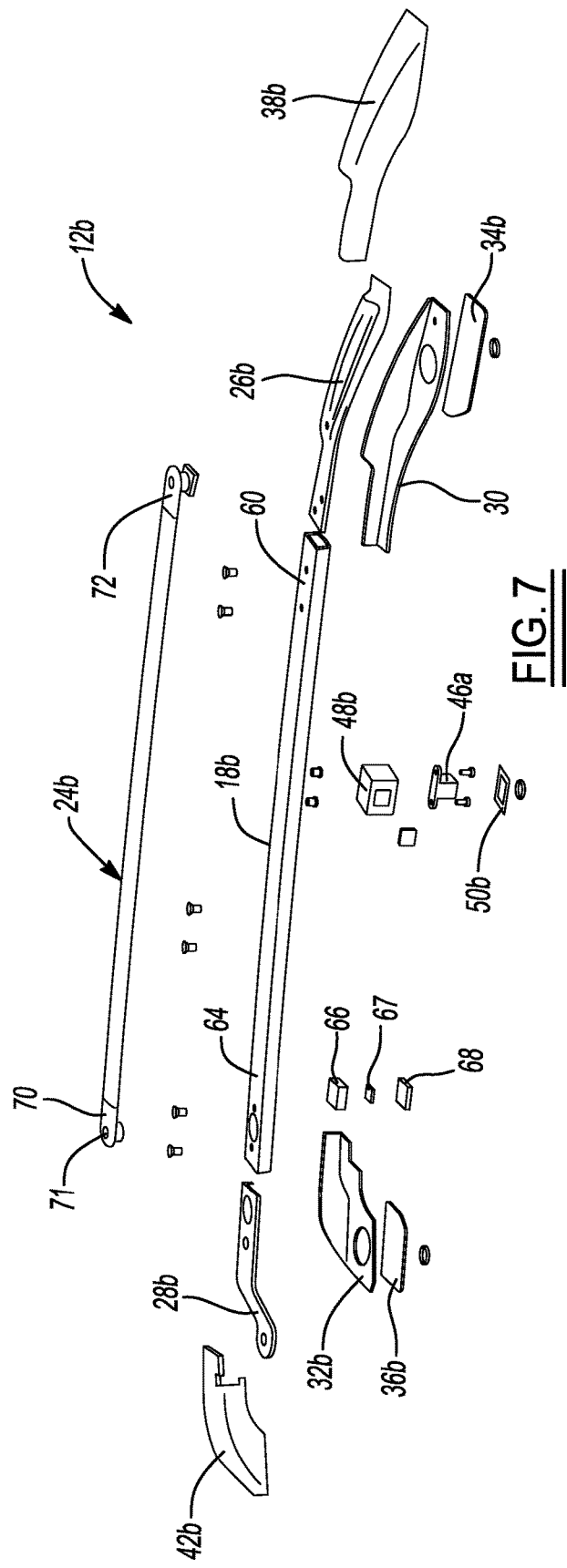

VEHICLE ARTICLE CARRIER RACK SYSTEM WITH STOWABLE, CONCEALABLE CROSS BARS

FIELD

The present disclosure relates to vehicle article carrier systems, and more particularly to a vehicle article carrier system having a construction which enables a pair of cross bars of the system to be secured in both operative and stowed positions, and when placed in their stowed positions during periods of non-use the cross bars are generally not visible from the sides of the vehicle.

BACKGROUND

The statements in this section merely provide background information related to the present disclosure and may not constitute prior art.

Article carriers have been used on various types of passenger motor vehicles, especially sedans, station wagons, SUVs and pickup trucks, for a number of years, and are viewed by many as being indispensable for carrying a wide variety of articles that would be difficult, impractical, inconvenient or impossible to carry within the passenger compartment of the vehicle. Typically such vehicle article carriers include a pair of side rails which are fixedly secured to a roof portion of the vehicle, with a pair of cross bars that extend between the support rails. Articles of widely varying shapes and sizes can be secured to the cross bars and thus supported above the outer body roof surface of the vehicle. The cross bars are also often used to secure other implements, such as ski racks, bicycle racks, etc., which enable a wide variety of recreational items to be easily supported using the cross bars.

The assignee of the present disclosure is a leader in manufacturing vehicle article carrier systems such as described above, and has also pioneered the development of vehicle article carrier systems that have stowable cross bars. By "stowable" it is meant cross bars which are able to be fixedly secured in non-operative positions extending parallel to the support rails, or parallel to separate forward and rearward pairs of support feet, rather than perpendicularly between the support rails, or perpendicularly between pairs of the support feet. In either instance, the ability to store the cross bars parallel to the support rails, or parallel to the support feet, can significantly reduce wind resistance and sometimes even wind noise, making the vehicle article carrier system more aerodynamically efficient during those times where the vehicle is being used but the cross bars are not needed to support any articles thereon.

Some vehicle article carrier systems developed by the assignee of the present disclosure are known in the industry as "swing-in-place" systems, because one end of each of one the pair of cross bars is pivotally secured at one end to a respective one of the forward or rearward support feet, while the opposite end is free to pivot between a stowed position extending between a forward pair of support feet, or between a rearward pair of the support feet. When the cross bars are not needed, each cross bar is secured at its opposite ends to one pair of forward and rearward mounted support feet, and as such they form the appearance of a support rail, or otherwise they may sit above a respective decorative support rail that extends between the forward and rearward support feet. But in both of these stowed positions, the cross bars typically are visible from the side of the vehicle. U.S. Pat. Nos. 5,511,709, 6,811,066, 7,066,364, 7,090,103, 7,448, 523, 8,028,875, 8,235,264, 8,251,267, 8,096,454, 8,276,794, 8,528,799, and U.S. Patent Publication No. 2016/0243994, are all owned by the assignee of the present disclosure, and all show various forms of stowable rack systems, or swing-in-place rack systems, or components that may be used therewith, and are all hereby incorporated by reference into the present disclosure.

There is a growing interest in enhancing the smooth, flowing, aerodynamic appearance of the support rails of a vehicle article carrier system, while still maintaining the significant practical benefits that swing-in-place and stowable vehicle article carrier systems provide with respect to the stowed positioning of the cross bars. A new vehicle article carrier system which provides the benefits of traditional swing-in-place and stowable vehicle article carrier systems, which provides the benefit of completely hiding the cross bars from view when they are stowed, would be highly desirable, not just from an aesthetic standpoint, but from a fuel efficiency standpoint as well.

SUMMARY

This section provides a general summary of the disclosure, and is not a comprehensive disclosure of its full scope or all of its features.

In one aspect the present disclosure relates to a vehicle article carrier system for carrying articles elevationally above an outer body surface of a vehicle. The system may comprise first and second support rail assemblies fixed supported on an outer body roof surface parallel to one another and parallel, with the first support rail being secured adjacent a first side of the vehicle, and the second support rail being secured adjacent a second side of the vehicle. The system may also include a first cross bar configured to be secured in a stowed position on the first support rail assembly, and in an operative position extending parallel between the first and second support rail assemblies and secured to the first and second support rail assemblies. The system may also include a second cross bar configured to be secured in a stowed position on the second support rail assembly, and in an operative position extending perpendicularly between the first and second support rail assemblies and secured to the first and second support rail assemblies. Each of the first and support rail assemblies include a main rail portion having an L-shape when viewed endwise. The L-shape has a vertical wall portion and a horizontal shelf portion. The vertical wall portion has a height generally equal to an upper surface of its associated said first or second cross bar when its associated said first or second cross bar is positioned in the stowed position, to thus hide said first or second cross bar. Thus, the first cross bar, when in the stowed position, is not visible when viewing the first support rail from the first side of the vehicle, and the second cross bar is not visible, when in the stowed position, when viewing the second support rail assembly from the second side of the vehicle.

In another aspect the present disclosure relates to a vehicle article carrier system for carrying articles elevationally above an outer body surface of a vehicle. The system may comprise first and second support rail assemblies fixed supported on an outer body roof surface parallel to one another. The first support rail is secured adjacent a first side of the vehicle, and the second support rail is secured adjacent a second side of the vehicle. A front cross bar is included which is configured to be secured in a stowed position on the first support rail assembly, and in an operative position extending parallel between the first and second support rail assemblies while being secured to the first and second support rail assemblies. A rear cross bar is included which is configured to be secured in a stowed position on the second support rail assembly, and in an operative position extending perpendicularly between the first and second support rail assemblies while being secured to the first and second support rail assemblies. Each of the first and support rail assemblies includes a main rail portion having an L-shape when viewed endwise. The L-shape has a vertical wall portion and a horizontal shelf portion. The vertical wall portion has a height generally equal to an upper surface of its associated said front or rear cross bar when its associated said front or rear cross bar is positioned in the stowed position, such that the front cross bar rests behind the vertical wall portion of said first support rail assembly when placed in the stowed position. Similarly, the rear cross bar rests behind the vertical wall portion of the second support rail assembly when placed in the stowed position. The first and second support rail assemblies cooperatively define first and second spaced apart mounting locations at which the rear cross bar can be secured when positioned in its operative position.

In still another aspect the present disclosure relates to a vehicle article carrier system for carrying articles elevationally above an outer body surface of a vehicle. The system may comprise first and second support rail assemblies fixed supported on an outer body roof surface parallel to one another. The first support rail being secured adjacent a first side of the vehicle, and the second support rail being secured adjacent a second side of the vehicle. A front cross bar is included which is configured to be secured in a stowed position on the first support rail assembly, and in an operative position extending parallel between the first and second support rail assemblies while being secured at its opposing ends to the first and second support rail assemblies. A rear cross bar is included which is configured to be secured in a stowed position on the second support rail assembly, and in an operative position extending perpendicularly between the first and second support rail assemblies while being secured at its opposing ends to the first and second support rail assemblies. Each of the first and support rail assemblies includes a main rail portion having an L-shape when viewed endwise. The L-shape has a vertical wall portion and a horizontal shelf portion. The vertical wall portion has a height generally equal to an upper surface of its associated front or rear cross bar when its associated front or rear cross bar is positioned in the stowed position, such that the front cross bar rests behind the vertical wall portion of said first support rail assembly when placed in the stowed position, and the rear cross bar rests behind the vertical wall portion of the second support rail assembly when placed in the stowed position. The horizontal shelf portion of the first support rail assembly has a length approximately equal to a width of the first cross bar, and the horizontal shelf portion of the second support rail assembly has a width approximately equal to a width of the second cross bar. The horizontal shelf portions are also positioned in a common horizontal plane.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings, in which:

FIG. 6 is an exploded perspective view of the components used to form the example embodiment of the support rail assembly which is mounted adjacent the driver's side of the vehicle in the drawing of FIG. 1;

FIG. 7 is an exploded perspective view of the components of the example embodiment of the support rail assembly which is mounted adjacent the passenger side of the vehicle in the drawing of FIG. 1;

DETAILED DESCRIPTION

Example embodiments will now be described more fully with reference to the accompanying drawings.

Figure 1:
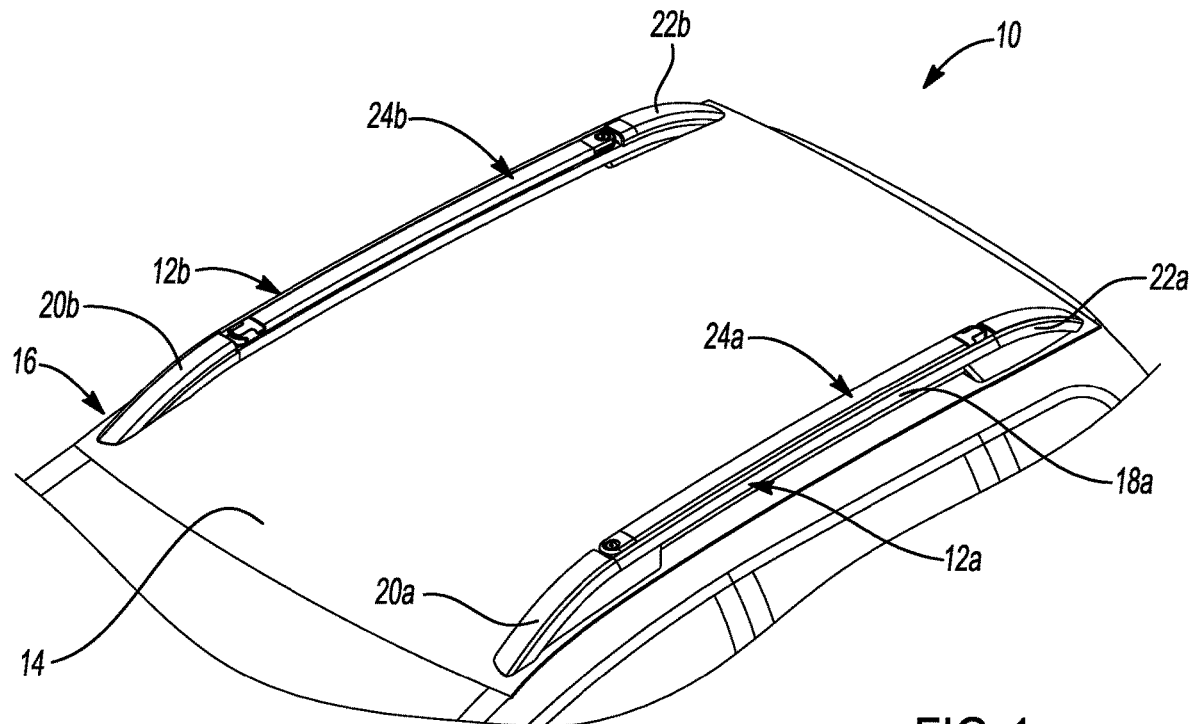
FIG. 1 is a perspective view of one example of a swing-in-place vehicle article carrier system in accordance with the present disclosure mounted on a roof of a vehicle, and with the cross bar assemblies thereof positioned in their stowed positions adjacent their respective support rail assemblies.
Figure 2:
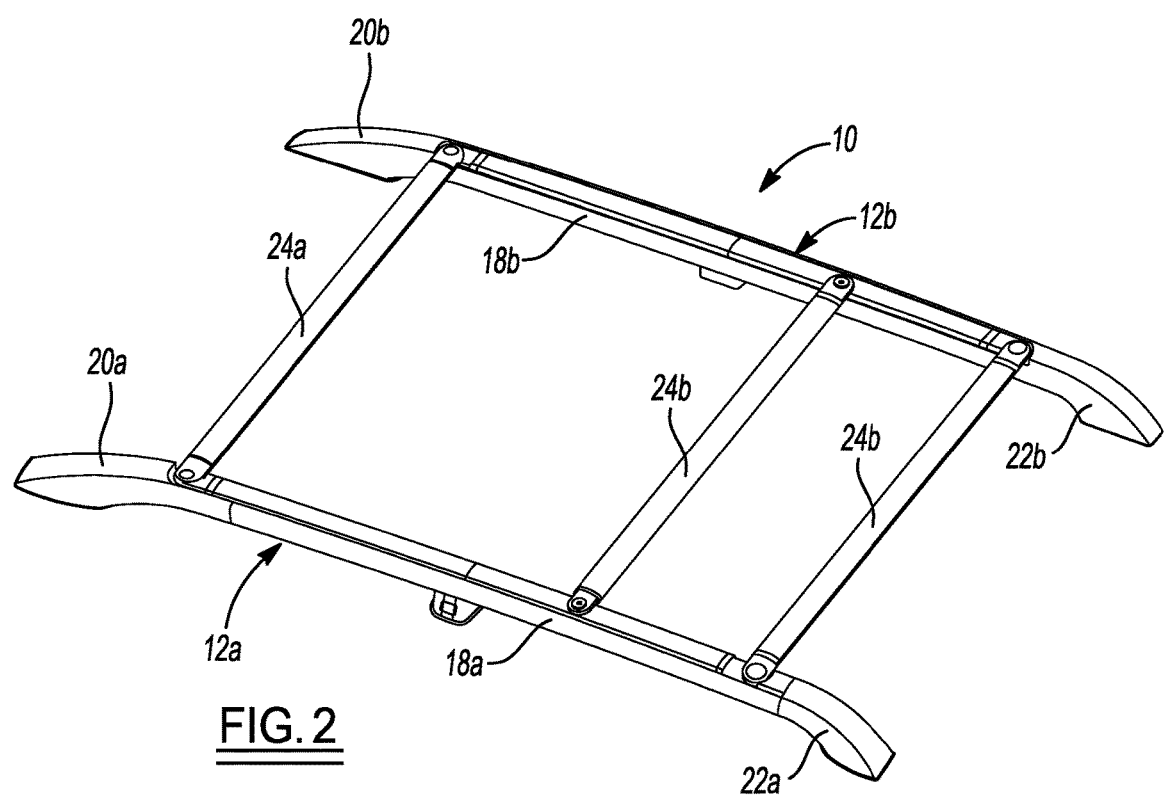
FIG. 2 is another perspective view of the system of FIG. 1 but looking at the system from above and from a rearward angle.

Referring to FIGS. 1 and 2, one embodiment of a swing-in-place rack system 10 in accordance with the present disclosure is shown. The system 10 includes a pair of support rails assemblies 12a and 12b which are fixedly secured to an outer body roof surface 14 of a motor vehicle 16. In this example the support rail assembly 12a is fixedly secured along a longitudinal length of the outer body vehicle roof surface 14 adjacent the driver's side of the vehicle 16, while the support rail assembly 12b is similarly secured adjacent the passenger side of the vehicle. Each support rail assembly 12a and 12b includes a main rail portion 18a or 18b supported between a front support foot assembly 20a or 20b, and a rear support foot assembly 22a or 22b. A front cross bar assembly 24a may be pivotally secured at one end and latched at its opposite end to the support rail assembly 12a to place it in a stowed position over the main rail portion 18a. Similarly, a rear cross bar assembly 24b may be pivotally secured at one end to the support rail assembly 12b, and latched at its opposite end to the support rail assembly 12b, to place it in a stowed position over the main rail portion 18b. As is well known with swing-in-place style rack systems, the lengths of the cross bar assemblies 24a and 24b are tailored such that they can be stowed on their respective support rails assemblies 12a and 12b, and when positioned perpendicularly in their operative positions, the support rail assemblies 12a and 12b are perfectly located, width-wise, on the outer body vehicle roof surface 14 to enable attachment of the free ends of the cross bar assemblies to opposite ones of the support rail assemblies 12a or 12b.

Figure 5:
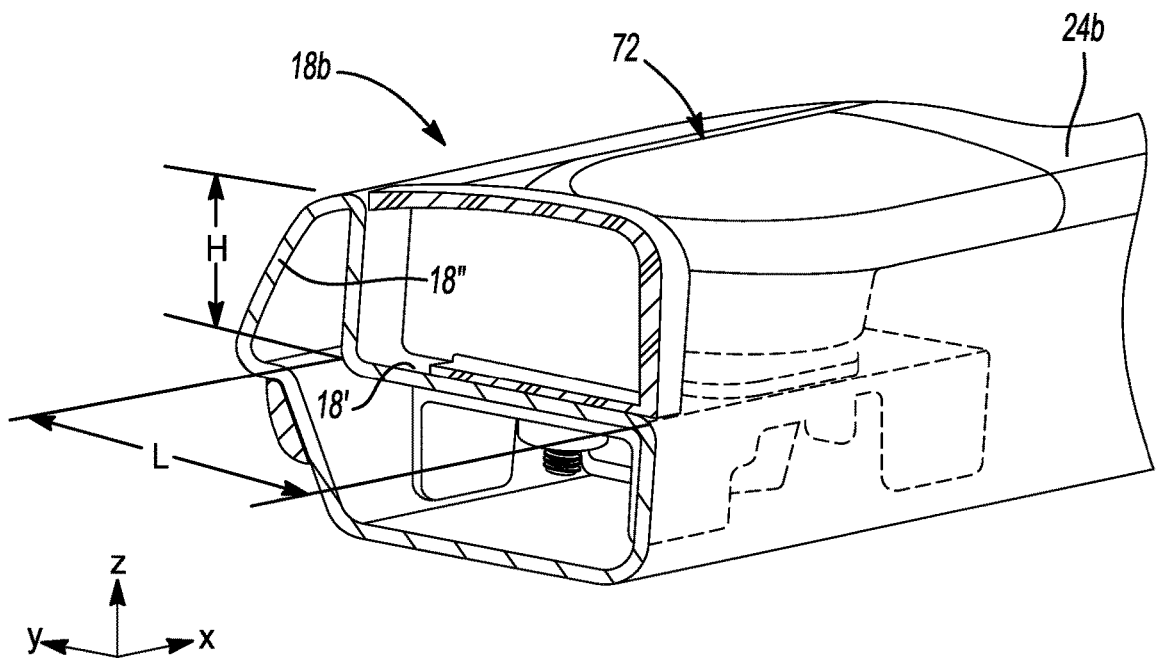
FIG. 5 is a perspective, cross-sectional view of a portion of the main rail portion illustrating the dimensions of the vertical and horizontal sections of the L-shaped main rail portion, which enable the cross bar assembly to be nestably supported in a compact, hidden manner thereon when mounted in its stowed position.

An important feature of each rail main portion 18a and 18b is its generally L-shaped construction, when viewed in cross section, as shown in FIG. 5. This feature will be discussed in greater detail in the following paragraphs. The L-shaped cross-sectional construction enables each of the cross bar assemblies 24a and 24b to rest within the L-shaped configuration of their associated support rails 12a and 12b, respectively, and be completely hidden from view, or virtually completely hidden from view, when a person stands along the driver's side or the passenger side of the vehicle 16 and looks at the system 10.

Figure 3:
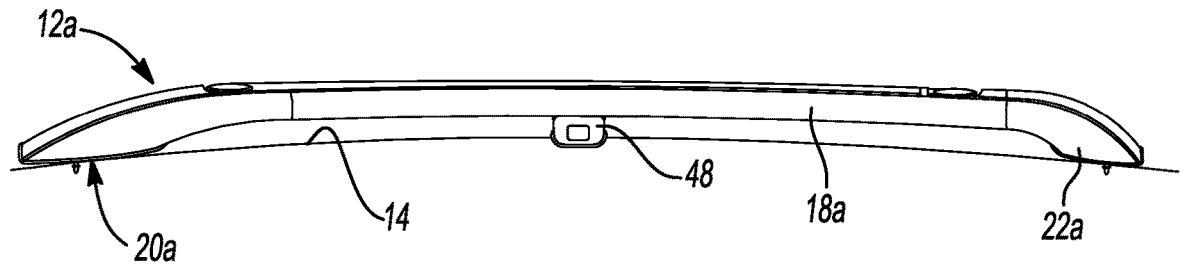
FIG. 3 is a side view of the support rail assembly on the driver's side of the vehicle, and helping to illustrate generally how the assembly looks to an individual standing alongside the driver's side of the vehicle.
Figure 4:
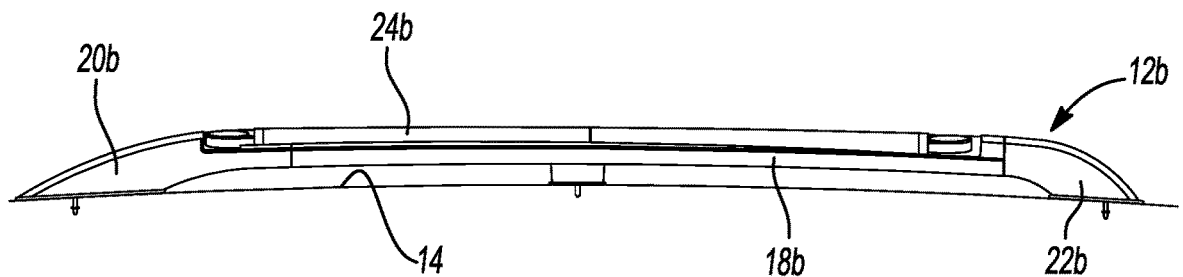
FIG. 4 shows a side view of the inside of the support rail assembly which is mounted adjacent the passenger side of the vehicle, illustrating the compact construction and appearance of the cross bar assembly being an integrally formed portion of the support rail assembly when in its stowed position.

The hidden cross bar assembly feature mentioned above can be seen even better in FIG. 3. From this view (i.e., standing alongside the driver's side of the vehicle 16), it appears that the support rail assembly 12a only incorporates the support foot assemblies 20a and 22a and the main rail portion 18a, and that no cross bar 24a is present on the support rail 12a. The same appearance would be present looking from the passenger side of the vehicle 16 when viewing the support rail assembly 12b. This provides an extremely clean, aesthetically pleasing appearance for the system 10. And as shown in FIG. 4, even the cross bar assembly 24b on the opposite side of the vehicle 16, while possibly being just slightly visible from some angles while standing on the driver's side of the vehicle 16, will still be very inconspicuous. This is largely because of how the cross bar assemblies 24a and 24b are both compactly housed on their respective main rail portions 18a and 18b when mounted in their stowed positions. And even as shown in FIG. 4, when viewing the inside of the support rail assembly 12b, the cross bar assembly 24b has the general appearance of being an integrally formed portion of the support rail assembly 12b.

With further reference to FIG. 5, the L-shaped cross-sectional construction of the main rail portion 18b can be seen. Again, the main rail portion 18a has this same cross-sectional shape, and will appear as a mirror image of the main rail portion 18b when the two support rail assemblies 12a and 12b are installed on the vehicle outer body roof surface 14. In FIG. 5 it can be seen that the rail main portion 18b has a horizontal shelf portion 18' and a vertical wall portion 18". The vertical wall portion 18" is about equal (i.e., level with) the upper surface of the cross bar assembly 24b, as indicated by arrow "H", while the horizontal shelf portion 18' is about equal in length to a cross-sectional width of the cross bar assembly 24b, as indicated by arrow "L". As such, the cross bar assembly 24b can be generally concealed from view when standing along the passenger side of the vehicle 16 because it does not extend above the upper edge of the vertical wall portion 18". Nor does the cross bar assembly 24 extend beyond an inward edge of the horizontal shelf portion 18' when mounted in its stowed position. This further helps to provide a clean, aesthetically pleasing appearance to the rack system 10 when it is viewed from the front or rear while the cross bar assemblies 24a and 24b are both mounted in their stowed positions. Still another advantage is that the horizontal shelf portions 18' of the support rail assemblies 12a and 12b lie within a common horizontal plane, which enables both of the cross bar assemblies 24a and 24b be positioned level when they are in their operative positions (assuming the vehicle 16 is on level ground), and both to be positioned at the same vertical height when positioned in their stowed positions on their respective support rail assembly 12a or 12b. This further helps to create a highly aesthetically pleasing appearance whether the cross bar assemblies 24a and 24b are secured in their operative or stowed positions.

The ability to stow the cross bar assemblies 24a and 24b on their respective main rail portions 18a and 18b, respectively, without the cross bar assemblies projecting above the main rail portions 18, or inwardly beyond the inner edges of the main rail portions 18a and 18b, also helps to significantly reduce the aerodynamic drag imposed by the system 10 while the vehicle 16 is travelling at intermediate or highway speeds, and potentially helps to eliminate, or substantially reduce, any wind noise that might be encountered when the vehicle is operated with the cross bar assemblies 24a and 24b mounted in their stowed positions. Whether viewing the vehicle 16 from the side, from the front or from the rear, the stowed cross bars 24a and 24b appear to be integral portions of the main support rail assemblies 12a and 12b when mounted in their stowed positions, and thus make for a very aesthetically clean looking and highly aerodynamic configuration.

With reference to FIG. 6, the cross bar assembly 24a and various other components of the support rail assembly 12a are shown. It will be understood that the support rail assembly 12b, shown in FIG. 7, is virtually a mirror image in its construction, and therefore will not be described in detail, with only differences between the two assemblies being noted in the following discussion. The support rail assembly 12a of FIG. 6 includes the main rail portion 18a which telescopically engages with structural mounting portions 26a and 28a of the front and rear support foot assemblies 22a and 22b, respectively. The front and rear structural mounting portions 26a and 28a may be of aluminum die cast construction or otherwise made from similarly robust construction techniques and materials (e.g., high strength plastics). The structural mounting portions 26a and 28a are attached to the outer body roof surface 14 of the vehicle 16 and telescopically receive the opposing ends of the main rail portion 18a. A front lower cover element 30a and a rear lower cover element 32a (e.g., both made from plastic), as well as front and rear mounting pads 34a and 36a, are interposed between the structural mounting portions and the outer body roof surface 14. Conventional threaded fasteners (or a combination of threaded fasteners and suitable adhesives) may be used to secure the structural mounting portions 26a and 28a to the outer body roof surface 14. Decorative front and rear cover portions 38a and 40a may also be secured over the front and rear structural mounting portions 26a and 28a, respectively. A center support assembly comprised of components structural mounting portions 46a, 48a and 50a may be interconnected using conventional threaded fasteners to secure a midpoint of the main rail portion 18a to the vehicle outer body roof surface 14 to provide added support and rigidity to the main rail portion 18a.

With further reference to FIGS. 6 and 7, the cross bar assembly 24a includes a first end having a pivot assembly 52 and a second end having a manually actuatable latching assembly 54. The pivot assembly 52 is coupled to a mounting surface 56 on the front structural mounting portion 28a. The latching assembly 54 may be engaged with an opening 58 in the main rail portion 18a to hold the cross bar assembly 24a in the stowed position on the main rail portion 18a, when not in use. When positioned extending perpendicularly between the two front support feet 20a and 20b, the latching assembly 54 passes through an opening 60 (FIG. 7) in the main rail portion 18b and into engagement with a portion of a front structural mounting portion 26b of the support rail assembly 12b. This places the front cross bar assembly 24a in its operative position extending perpendicularly between the two support rail assemblies 12a and 12b.

Figure 10:
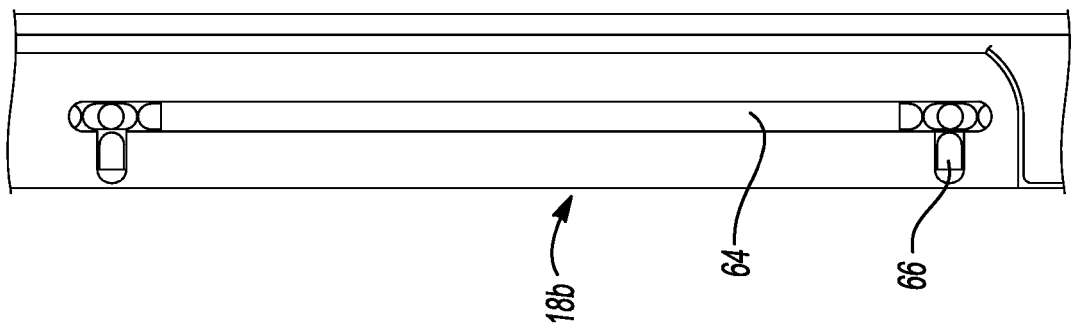
FIG. 10 is a plan view of just a portion of the main rail portion of the passenger side support rail assembly illustrating the channel which allows sliding repositioning of the pivotally secured end of the rear cross bar assembly between its two different operative positions.

With further reference to FIGS. 6 and 7, the support rail assembly 12b is similar in construction to the support rail assembly 12a, and components in common will be designated with the same reference number used to describe the support rail assembly 12a but with a "b" suffix. In FIG. 6 it will be noted that the support rail assembly 12a further includes a mounting element 62 fixedly secured by conventional threaded fasteners within the main rail portion 18a, and accessible through an opening 76 formed in the main rail portion. The main rail portion 18b includes a channel 64 formed along a portion of its length, and generally in the rear half of the length thereof. The channel 64 is also shown in FIG. 10. A slidable securing element, in this example a slide block 66, with an associated elastomeric O-ring 67 and a threaded fastener plate 68, are all positioned inside the main rail portion 18b, and coupled to a pivot assembly 70 associated with a first (i.e., pivoting) end of the rear cross bar assembly 24b, which enables pivoting of the rear cross bar assembly 24b between the stowed position, wherein it is arranged parallel to the main rail portion 18b, and its operative position wherein it extends perpendicularly between the rear support foot assemblies 22a and 22b. The pivot assembly 70, as well as the pivot assembly 52 (FIG. 6), may each be constructed in accordance with the teachings of one or more of the above referenced U.S. Patents, which enables a small degree of pivotal motion within a vertical plane, as well as the needed pivoting motion within a horizontal plane, to enable lifting the cross bar 24a or 24b vertically a small degree while repositioning the cross bar assembly 24a or 24b to one or the other of the support rail assemblies 12a or 12b. The O-ring 67 provides the beneficial feature of providing a small degree of resilience in the attachment of the cross bar 24a or 24b which allows its associated cross bar to be lifted vertically a small amount, while still permitting pivoting motion in the horizontal plane, and while still enabling a sufficiently secure attachment of the pivoting end of each cross bar assembly to prevent any rattling during use of the vehicle 16. The opposite end of the rear cross bar assembly 24b includes a user engageable latching assembly 72 which may be identical in construction to the latching assembly 54. This construction allows the latching assembly 72 to be engaged with structural portion 60 when the rear cross bar assembly 24b is stowed on the main rail portion 18b, or engaged in a first operative position with the opening 58, or a second operative position at the opening 76, more forwardly positioned, with the mounting element 62. Thus, the rear cross bar assembly 24b has three possible mounting positions, one being a stowed position on its associated main rail portion 18b, a second being a rearward most operative position, and the third being an intermediate position closer to the front of the vehicle 16. These two rearward mounting positions are shown in FIG. 2, with it being understood one or the other, but not both, will be used at any given time. This provides significant added flexibility in carrying articles of widely varying dimensions. The pivot assembly 70 can be secured at either extreme end of the channel 64, to thus help hold the rear cross bar assembly 24b in any one of the above three described positions, by simply tightening a threaded element 71 (FIG. 7) that extends therethrough and engages the threaded fastener plate 68.

With further brief reference to FIGS. 6 and 7, it will be appreciated that the latching assemblies 54 and 72 are well known in the art. These types of user engageable latching assemblies, for example, are disclosed in U.S. Pat. Nos. 6,811,066 and 7,066,364, assigned to the assignee of the present disclosure. Suitable pivot assemblies for use with a cross bar are also disclosed in these patents. Furthermore, it will be appreciated that the various components shown in FIG. 7 and denoted with reference numbers having the suffix "b" are the counterparts to those described above and shown in FIG. 6.

Figure 9:
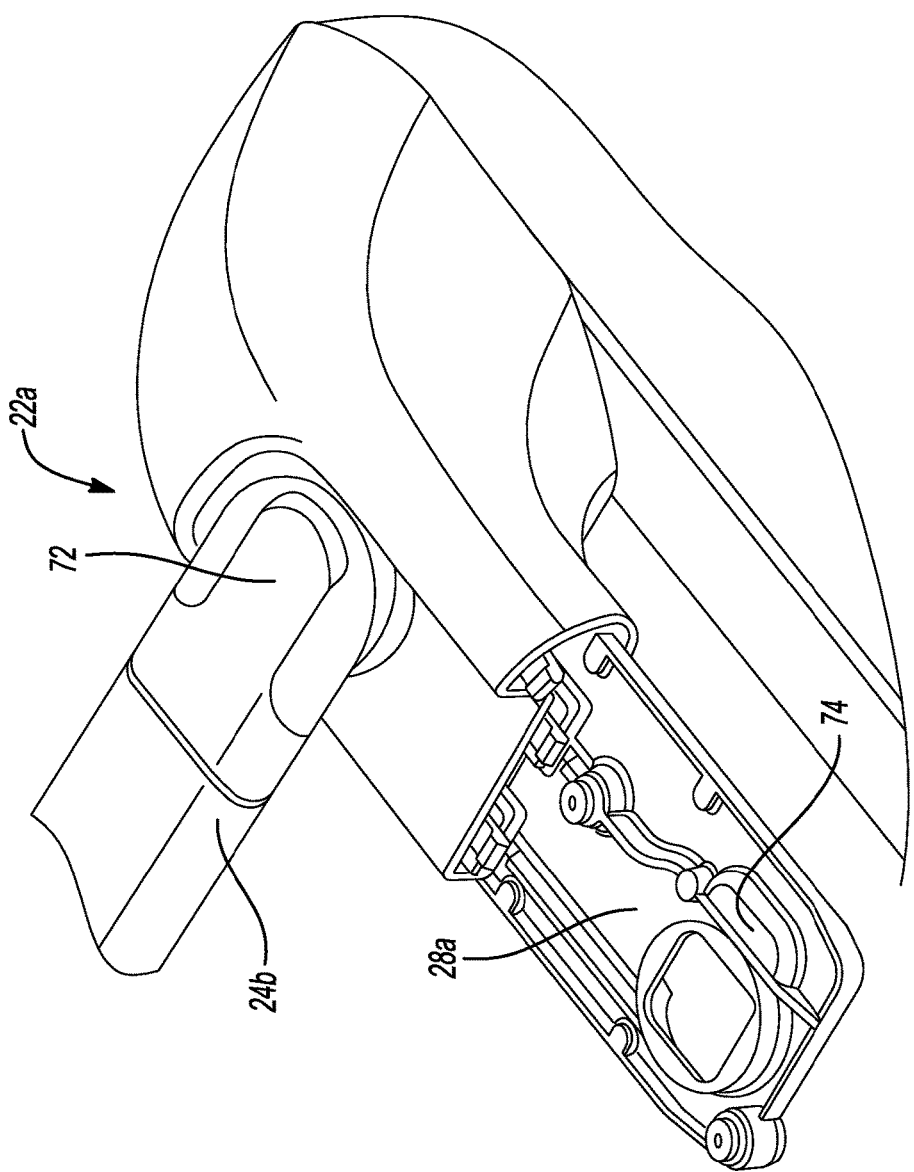
FIG. 9 is a top perspective view of a portion of the rear support foot associated with the driver's side support rail assembly, illustrating the mounting element used to secure the rear cross bar in its rearward most operative position.
Figure 8:
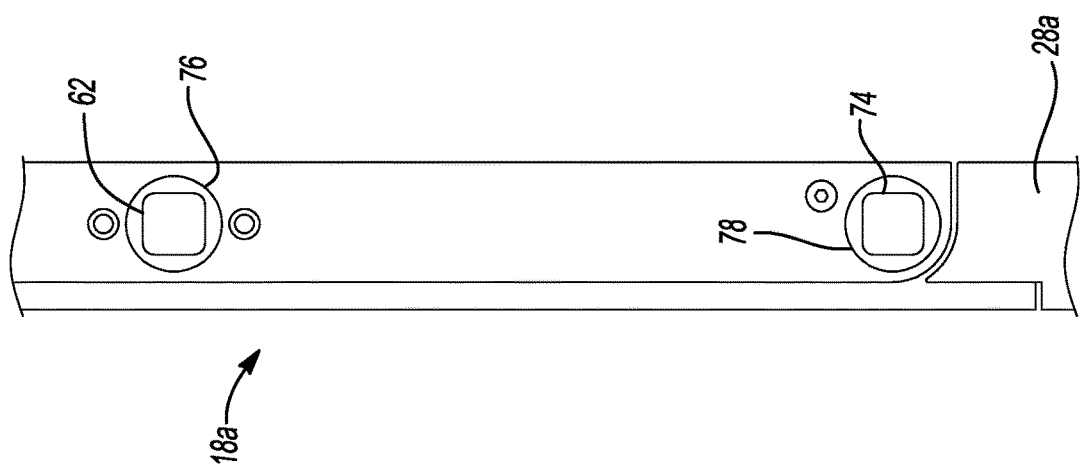
FIG. 8 is a plan view of a rear area of the main rail portion used in the driver's side support rail assembly shown in FIG. 1, illustrating the two mounting locations available for mounting the rear cross bar assembly in its two longitudinally different operative locations.

In FIG. 8 a plan view of a rear portion of the main rail portion 18a is shown with the mounting element 62 fixedly secured within the main rail portion. The rear structural mounting portion 28a includes an integrally secured mounting element 74, as also shown in FIG. 9, which is inserted within the main rail portion 18a when the rear structural mounting portion 28a is assembled to the main rail portion 18a during assembly of the support rail assembly 12a. The main rail portion 18a includes the generally circular opening 76 and an additional generally circular opening 78, which each expose their respective mounting elements 62 and 74. This enables the latching assembly 54 of the rear cross bar assembly 24b to engage either one of the mounting elements 62 or 74, depending on which of the two rearward locations it is being mounted at. And as noted above, the latching assembly 54 of the front cross bar assembly 24a engages the mounting element 74 when it is positioned in its stowed position on the support rail assembly 12a.

Referring briefly to FIG. 10, the channel 64 in the main rail portion 18b forms a track which can be seen better along with the slide block 66 positioned therein. The slide block 66 is shown in both of its potential rearward mounting positions, although it will be appreciated that in actual use of the system 10 there is only one slide block 66 being used. The slide block 66 is held at a specific position by tightening of the threaded external fastener element 71 to the fastener plate 68. This construction secures the pivot assembly 70 to the main rail portion 18b while still allowing both pivoting motion of the rear cross bar assembly 24b, as well as linear sliding movement of the pivot assembly 70, at one end of the rear cross bar assembly 24b.

Figure 11:
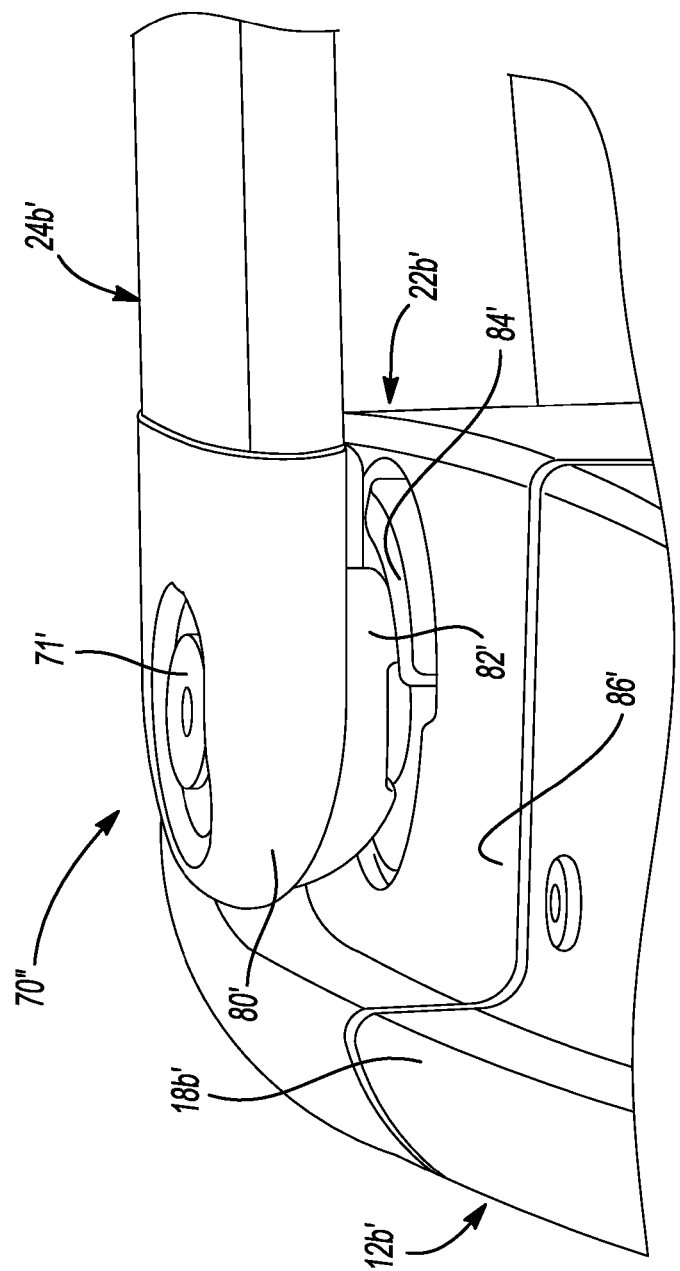
FIG. 11 shows a perspective side view of another embodiment of the passenger side support rail assembly and the rear cross bar assembly in which the pivoting end of the rear cross bar assembly is fully removable, and in which the rear support foot includes an integrally formed circumferential ramp portion which helps to prevent contact of the rear cross bar assembly with the vehicle outer body roof surface if the user should accidentally release the rear cross bar assembly before the opposite end is positioned fully over one or the other of the support rail assemblies.

Referring briefly to FIG. 11, it will be appreciated that while the system 10 makes use of the rear cross bar assembly 24b being pivotally attached at one end, that instead both ends of the rear cross bar assembly 24b could be fully detachable from the support rail assemblies 12a and 12b, and two spaced apart, discrete mounting locations provided for near the rear ends of the support rail assemblies 12a and 12b. FIG. 11 shows this modification where a prime (') symbol is used to help denote components which may correspond to those used to describe the system 10 in FIGS. 1-10. For example, the rear cross bar assembly 24b' in FIG. 11 has a pivot assembly 70' construction which incorporates a threaded element 71' which extends therethrough and which engages a suitable threaded plate or element (not shown in FIG. 11) fixedly mounted within the support rail assembly 12b'. As such, manual removal of the threaded element 71' enables the pivot assembly 70' to be completely lifted off of its associated support rail assembly 12b' and moved to a more forward position on the support rail assembly 12b' and then re-secured thereto using the same threaded element 71'. This configuration also allows the rear cross bar 24b' to be pivoted into its operative position, when mounted as shown in FIG. 11, by simply rotating the cross bar assembly 24b' perpendicularly until the opposite end is positioned over the other support rail assembly 12a.

FIG. 11 shows another feature that may be incorporated into the system 10 which prevents the rear cross bar assembly 24b' from falling on the outer body roof surface 14 if the user accidentally loses his/her grip on the assembly 24b' while moving the rear cross bar assembly from its stowed position into its operative position, or from its operative position into its stowed position. This involves incorporating a housing 80' having a lower surface 82' for the pivot assembly 70'. A rear support foot 22b' includes a circumferential ramp portion 84' projecting up from an upper surface 86' thereof. The ramp portion 84' cooperates with the lower surface 82' by contacting the lower surface 82' to prevent the cross bar assembly 24b' from dropping down onto the outer body roof surface 14 of the vehicle 16 if the user should accidentally release the cross bar assembly 24b' before the latching assembly 72 at its opposite end is positioned over the support rail assembly 12a. In such an instance, the latching assembly 72 will be held above the outer body roof surface 14 by contact with the ramp portion 84'. This feature also enables shorter individuals who may not be able to maneuver the cross bar assembly 24b easily into its fully perpendicular extending position to initiate the process from one side of the vehicle 16 by moving the rear cross bar assembly to an intermediate position over the outer body roof surface 14, and then going to the other side of the vehicle to reach up and pull the opposite end of the rear cross bar assembly 24b into its fully perpendicular position for attachment to the support rail assembly 12a. It will be appreciated that this feature may be incorporated into the front support foot 20a as well if desired.

Figure 12:
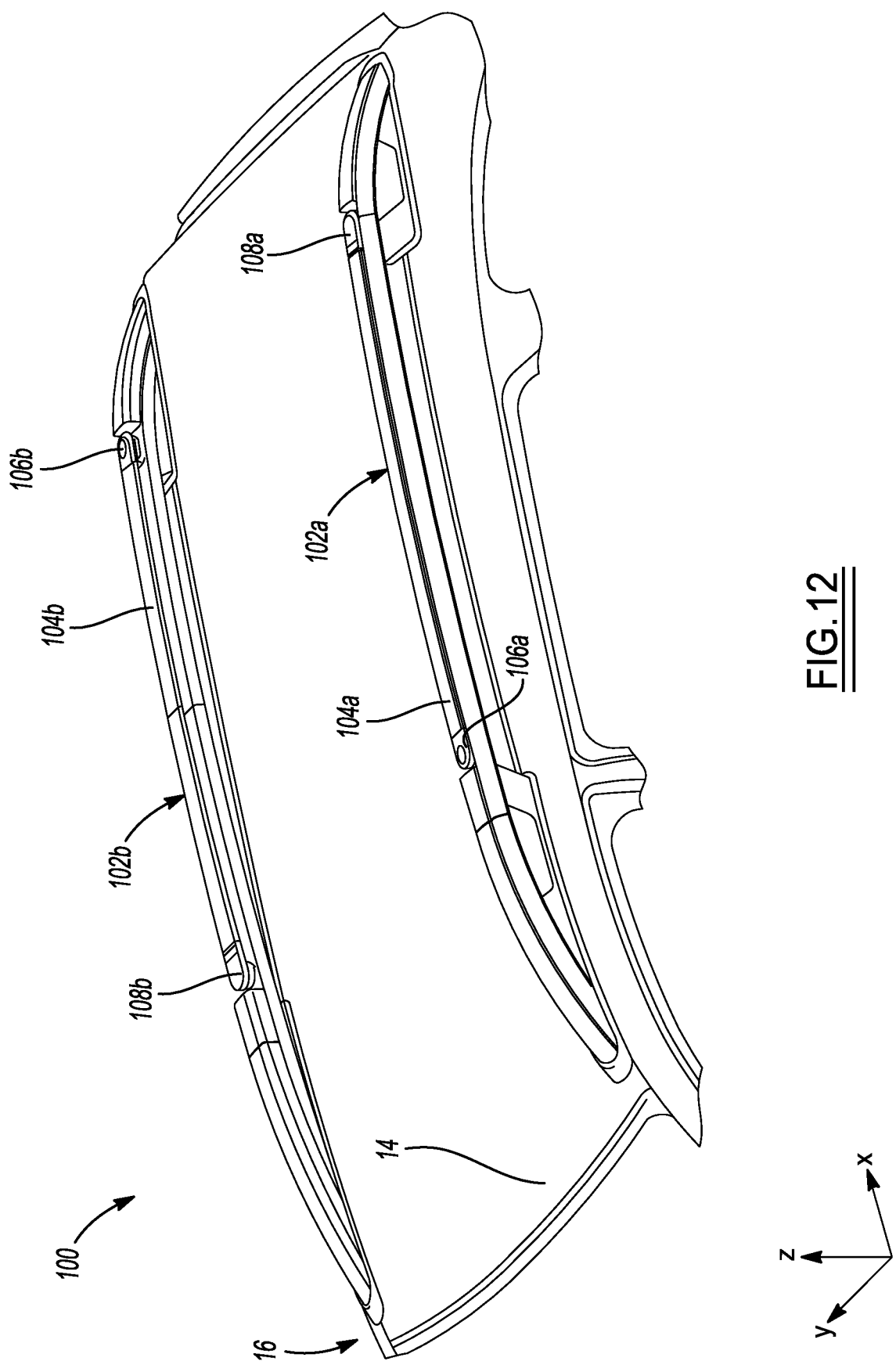
FIG. 12 shows a swing-in-place rack system in accordance with another embodiment of the present disclosure in which the support rail assemblies each make use of a single piece, stretch formed main rail portion, which enables a dramatic reduction in the number of independent component parts needed to fully implement each support rail assembly.

Referring now to FIG. 12, a swing-in-place vehicle article carrier system 100 in accordance with another embodiment of the present disclosure is shown. The system 100 is similar in operation to the system 10, but instead of a multi-piece support rail construction as used for the support rail assemblies 12a and 12b, which requires the structural mounting portions 26a and 28a, the system 100 makes use of one piece support rail assemblies 102a and 102b. This construction dramatically reduces the construction complexity of the support rail assemblies 102a and 102b, while providing even further enhanced structural capability due to its single piece construction. Support rail assembly 102a houses a front cross bar assembly 104a, while support rail assembly 102b houses a rear cross bar assembly 104b. The front cross bar assembly 104a has a first end with a pivot assembly 106a which provides for pivotal movement of the cross bar assembly 104a between it stowed position and its operative position, while the opposite end includes a latching assembly 108a which allows the front cross bar assembly to be secured in its operative position, or as well as in its stowed position. The rear cross bar assembly 104b similarly includes a pivot assembly 108b located at its rear end, and a latching assembly 106a located at its front end, enabling the rear cross bar assembly to be pivoted and secured in either one of two different operative positions near a rear area of the support rail assemblies 102a and 102b. In this example the rear cross bar assembly 104b is fully removable to enable the rearward mounting at two different positions, as described above with respect to FIG. 10. The system 100 provides the same benefits as the system 10 in that the cross bar assemblies 104a and 104b are hidden from view when placed in their stowed positions, and when an individual is viewing the vehicle 16 from most angles around the perimeter of the vehicle.

Figure 13:
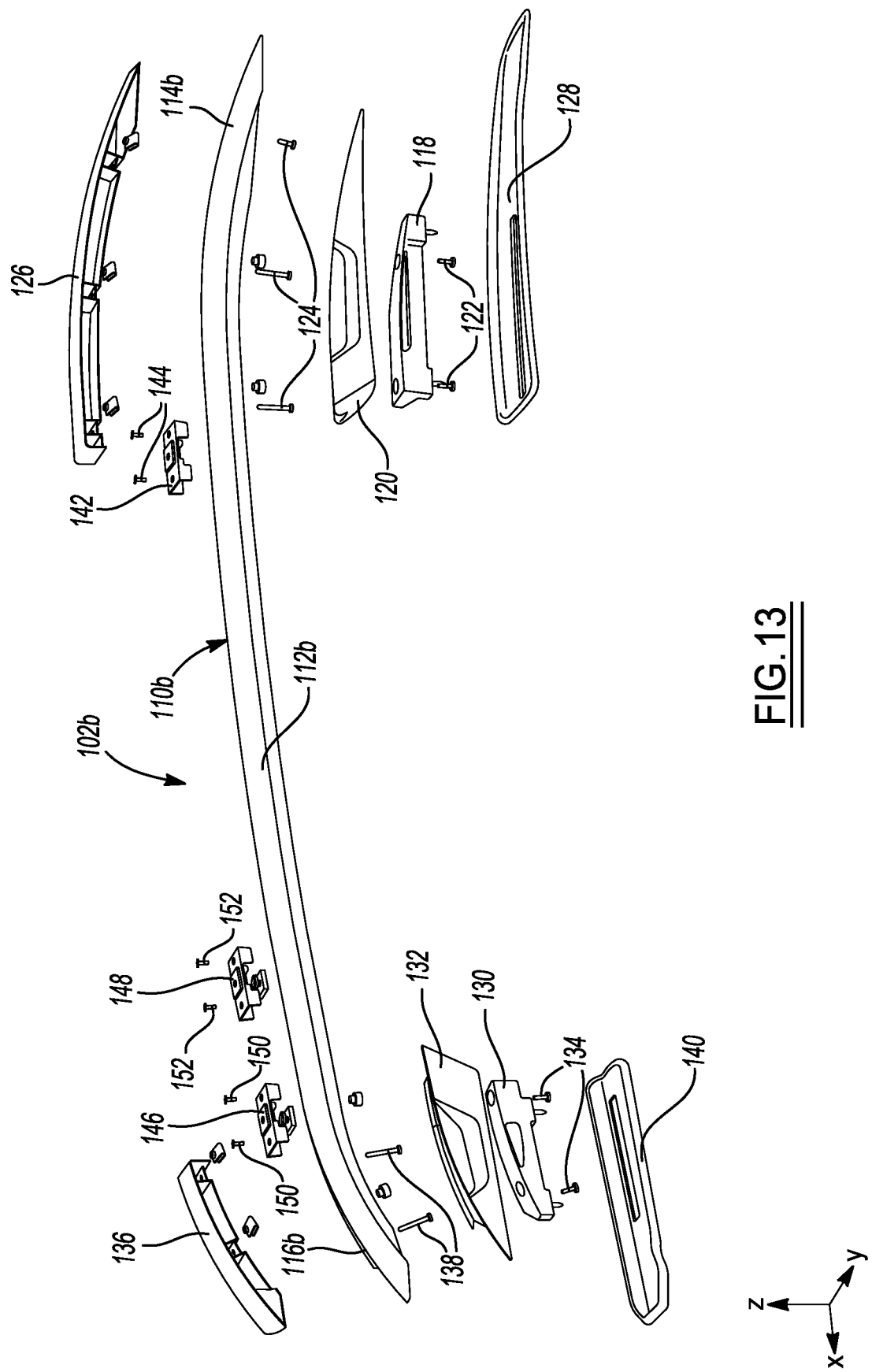
FIG. 13 shows an exploded perspective view of the passenger side support rail assembly of FIG. 12, illustrating the dramatically reduced number of independent components needed for this embodiment of the support rail assembly.

Referring to FIG. 13, an exploded perspective view of the components of the support rail assembly 102b are shown to illustrate the dramatically reduced number of individual component parts which make up its construction. It will be appreciated that the support rail assembly 102a may be of nearly identical construction, with the principal differences being the positioning of the components which engage with the latching assemblies 108a to enable the cross bar assemblies 104a and 104b to be placed in their stowed and operative positions.

Of primary importance in the construction of the support rail assembly 102b shown in FIG. 13 is a single piece, stretch bent main rail portion 110b, which may be made from any suitable material, but preferably is made from aluminum or steel. The main rail portion 110b has a central portion 112b having the L-shaped cross-sectional construction described herein for the support rail assemblies 12a and 12b, but also includes an integrally formed curving front portion 114b at one end, and an integrally formed curving rear portion 116b at its other end. A front structural mounting block 118 (e.g., die-cast aluminum or steel) with integrated threaded fasteners is secured to the curving front portion 114b of the main rail portion 110b and to a decorative lower/outer cover member 120 by using threaded fasteners 122. The decorative lower/outer cover has a shape and profile to fit under the curving front portion 114b of the main rail portion 110b. A separate plurality of threaded screws 124 is used to secure a decorative upper cover member 126 to the lower/outer cover member 120 such that the curving front portion 114b is partially encapsulated between the two decorative cover members 120 and 126. A resilient pad 128 is placed directly against the outer body roof surface 14, and lower areas of the two decorative cover members 120 and 126 rest against the pad 128, which serves to take up any gaps between the decorative cover members 120/126 and the outer body roof surface 14. A similar construction is present at the curving rear portion 116b of the main rail portion 110b, where a structural mounting block 130 with integrated threaded fasteners is secured to the curving rear portion 116b, and to a decorative rear lower cover member 132, via threaded fasteners 134. A decorative rear upper/inner cover member 136 is secured to the decorative rear lower cover member 132 via a separate plurality of threaded fasteners 138, which partially encapsulates the rear portion 116b of the main rail portion 110b. A resilient pad 140 is placed between the outer body roof surface 14 and the decorative rear cover members 132/136 to help take up any gaps between these components and the outer body roof surface. This configuration enables the curving front and rear portions 114b and 116b of the main rail portion 110b to be directly secured to the vehicle outer body surface 14, which allows forces experienced by the main rail portion 110b to be transferred directly into the outer body surface 14 rather than into an intermediate component. This construction not only significantly enhances the strength of the main rail portion 110b, but also significantly enhances its overall rigidity as well. The reduced number of independent component parts also reduces costs and enables even quicker and easier assembly of the support rail assembly 102b on the vehicle 16.

With further reference to FIG. 13, a front cross bar mounting element 142 is fixedly secured with threaded fasteners 144 to the main rail portion, which provides the point of attachment for the latching assembly 108a of the front cross bar assembly 104a when the front cross bar assembly is secured in its operative position. Similarly, a pair of rear cross bar mounting elements 146 and 148 are secured to the main rail portion 110b via pairs of threaded fasteners 150 and 152, respectively. The rear cross bar mounting elements 146 and 148 define the two operative positions for the rear cross bar assembly 104b, while the rearward most cross bar mounting element 146 also operates to provide an attachment point for the rear cross bar assembly 104b when it is secured in its stowed position over the support rail assembly 102b.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A vehicle article carrier system for carrying articles elevationally above an outer body surface of a vehicle, the system comprising:
   first and second support rail assemblies fixedly supported on an outer body roof surface parallel to one another, the first support rail assembly being secured adjacent a first side of the vehicle, and the second support rail assembly being secured adjacent a second side of the vehicle;
   a first cross bar configured to be secured in a stowed position on the first support rail assembly, and in an operative position extending parallel between the first and second support rail assemblies and secured to the first and second support rail assemblies;
a second cross bar configured to be secured in a stowed position on the second support rail assembly, and in an operative position extending perpendicularly between the first and second support rail assemblies and secured to the first and second support rail assemblies;
each of the first and second support rail assemblies including:
a metallic main rail portion having an L-shape when viewed endwise;
the L-shape having a vertical wall portion and a horizontal shelf portion; and
the vertical wall portion having a height sufficient to extend at least to an upper surface of its associated said first or second cross bar when its associated said first or second cross bar is positioned in the stowed position, to thus hide said first or second cross bar;
the horizontal shelf portion supporting said cross bars above the outer body surface such that a clearance exists between a lower surface of the metallic main rail portion and the outer body surface of the vehicle;
wherein the first cross bar, when in the stowed position, is not visible when viewing the first support rail from the first side of the vehicle, and the second cross bar is not visible, when in the stowed position, when viewing the second support rail assembly from the second side of the vehicle; and
wherein each of the first and second support rail assemblies includes a stretch formed main rail portion having a central portion and gradually curving end portions integrally formed with, and extending from opposing sides, of the central portion, and where the curving end portions are configured to be secured via external fasteners to the outer body roof surface of the vehicle, and are visible along an entire length thereof when viewed from a side of the vehicle.

2. The system of claim 1, wherein the horizontal shelf portion of each one of said first and second support rail assemblies extends perpendicularly from the vertical wall portion, and
wherein either the first and second cross bars are positioned over a respective one of the horizontal shelf portions when disposed in their stowed positions.

3. The system of claim 2, wherein a dimension of the horizontal shelf portion of the first support rail assembly is equal to a width of the first cross bar, and a dimension of the horizontal shelf portion of the second support rail assembly is equal to a width of the second cross bar.

4. The system of claim 1, wherein a first end of the first cross bar is pivotally secured to the first support rail assembly.

5. The system of claim 1, wherein the first end of the second cross bar is pivotally secured to the second support rail assembly.

6. The system of claim 5, wherein the first end of the second cross bar is slidably movable along a portion of the second support rail assembly to define at least first and second apart operative positions for the second cross bar.

7. The system of claim 6, wherein:
the second support rail assembly includes an elongated linear slot and a slide block engaged therewith; and
the first end of the second cross bar is engaged with the slide block to permit movement of the first end of the second cross bar along the elongated linear slot.

8. The system of claim 7, wherein the elongated linear slot defines two spaced apart securing locations for securing the first end of the second cross bar.

9. The system of claim 1, wherein a first end of the second cross bar includes a fastening element to enable detachment of the first end of the second cross bar at a first mounting location on the second support rail assembly, and reattachment of the first end of the second cross bar at a second mounting location on the second support rail assembly which is spaced apart from the first mounting location.

10. The system of claim 1, wherein:
a first end of the first cross bar is pivotally secured to the first support rail assembly and a second end of the first cross bar includes a first latching assembly for engaging with the second support rail assembly to hold the first cross bar in the operative position; and
a first end of the second cross bar is pivotally secured to the second support rail and a second end of the second cross bar includes a second latching assembly for engaging with the first support rail assembly to secure the second cross bar in the operative position.

11. The system of claim 1, wherein:
the second support rail assembly includes a support foot; and
wherein the support foot includes a raised ramp portion which cooperates with a first end of the second cross bar to prevent a second end of the second cross bar from touching the outer body roof surface of the vehicle when the second cross bar is released and the second end is positioned between the first and second support rail assemblies.

12. A vehicle article carrier system for carrying articles elevationally above an outer body surface of a vehicle, the system comprising:
first and second support rail assemblies fixed supported on an outer body roof surface parallel to one another, the first support rail being secured adjacent a first side of the vehicle, and the second support rail being secured adjacent a second side of the vehicle;
a front cross bar configured to be secured in a stowed position on the first support rail assembly, and in an operative position extending parallel between the first and second support rail assemblies and secured to the first and second support rail assemblies;
a rear cross bar configured to be secured in a stowed position on the second support rail assembly, and in an operative position extending perpendicularly between the first and second support rail assemblies and secured to the first and second support rail assemblies;
each of the first and second support rail assemblies including:
a metallic main rail portion having an L-shape when viewed endwise;
the L-shape having a vertical wall portion and a horizontal shelf portion; and
the vertical wall portion having a height generally equal to an upper surface of its associated said front or rear cross bar when its associated said front or rear cross bar is positioned in the stowed position, such that said front cross bar rests behind the vertical wall portion of said first support rail assembly when placed in the stowed position, and the rear cross bar rests behind the vertical wall portion of the second support rail assembly when placed in the stowed position;
the horizontal shelf portion supporting said cross bars above the outer body surface such that a clearance exists between a lower surface of the metallic main rail portion and the outer body surface of the vehicle;

wherein the first and second support rail assemblies cooperatively define first and second spaced apart mounting locations at which the rear cross bar can be secured, wherein each of said first and second support rail assemblies includes a main rail portion forming a single piece stretch bent rail including a central section and integrally formed, gradually curving, opposing end portions, and wherein the gradually curving, opposing end portions are configured to be secured via external fasteners to the outer body roof surface of the vehicle, and are visible along an entire length thereof when viewed from a side of the vehicle.

13. The system of claim 12, wherein the horizontal shelf portions of the first and second support rail assemblies are further arranged to extend perpendicularly toward one another in a common horizontal plane.

14. The system of claim 13, wherein the horizontal shelf portion of the first support rail assembly has a length dimension sufficient to extend fully under the front cross bar when the front cross bar is placed in the stowed position on the first support rail assembly.

15. The system of claim 13, wherein the horizontal shelf portion of the second support rail assembly has a length dimension sufficient to extend fully under the rear cross bar when the rear cross bar is placed in the stowed position on the second support rail assembly.

16. The system of claim 12, wherein:
the first support rail assembly includes a main rail portion having an elongated linear slot formed along a portion of its length, the elongated linear slot helping to define the first and second spaced apart mounting locations;
the system further includes a slide block engaged with the elongated linear slot; and
a first end of the rear cross bar is pivotally engaged with the slide block to enable the first end of the rear cross bar to be slidably moved along the elongated linear slot between the first and second spaced apart mounting locations.

17. The system of claim 12, wherein the rear cross bar is configured to be detachable at both of its opposing ends to enable detachment from one of said first or second spaced apart mounting locations, and re-securing at the other one of said first or second spaced apart mounting locations.

18. A vehicle article carrier system for carrying articles elevationally above an outer body surface of a vehicle, the system comprising:
first and second support rail assemblies fixedly supported on an outer body roof surface parallel to one another, the first support rail being secured adjacent a first side of the vehicle, and the second support rail being secured adjacent a second side of the vehicle;
a front cross bar configured to be secured in a stowed position on the first support rail assembly, and in an operative position extending parallel between the first and second support rail assemblies and secured at its opposing ends to the first and second support rail assemblies;
a rear cross bar configured to be secured in a stowed position on the second support rail assembly, and in an operative position extending perpendicularly between the first and second support rail assemblies and secured at its opposing ends to the first and second support rail assemblies;
each of the first and second support rail assemblies including:
a metallic main rail portion having an L-shape when viewed endwise;
the L-shape having a vertical wall portion and a horizontal shelf portion; and
the vertical wall portion having a height generally equal to an upper surface of its associated said front or rear cross bar when its associated said front or rear cross bar is positioned in the stowed position, such that said front cross bar rests behind the vertical wall portion of said first support rail assembly when placed in the stowed position, and the rear cross bar rests behind the vertical wall portion of the second support rail assembly when placed in the stowed position;
the horizontal shelf portion supporting said front and rear cross bars above the outer body surface such that a clearance exists between a lower surface of the metallic main rail portion and the outer body surface of the vehicle;
the horizontal shelf portion of the first support rail assembly having a length approximately equal to a width of the front cross bar, and the horizontal shelf portion of the second support rail assembly having a width approximately equal to a width of the rear cross bar; and
the horizontal shelf portions are positioned in a common horizontal plane; and
wherein each of said first and second support rail assemblies includes a main rail portion forming a single piece stretch formed rail including a central section and integrally formed, curving, opposing end portions, and wherein the curving, opposing end portions are configured to be secured via external fasteners to the outer body roof surface of the vehicle, and are visible along an entire length thereof when viewed from a side of the vehicle.

* * * * *